Nov. 29, 1938.  W. M. SCOTT, JR  2,138,617
ELECTRICAL CONDUCTOR
Filed Jan. 25, 1936
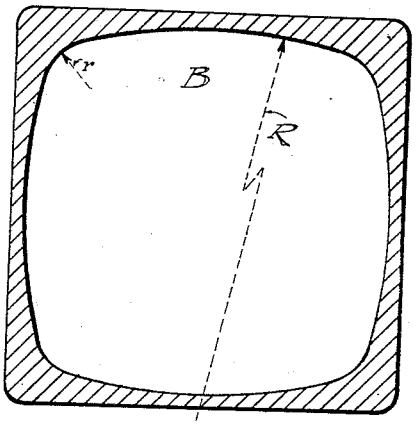
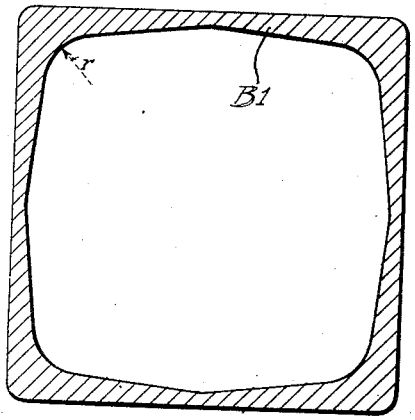
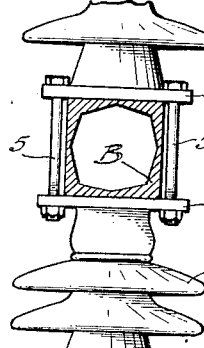
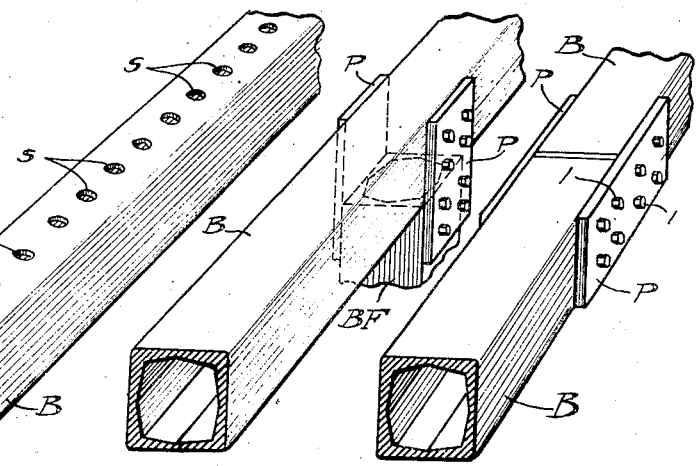
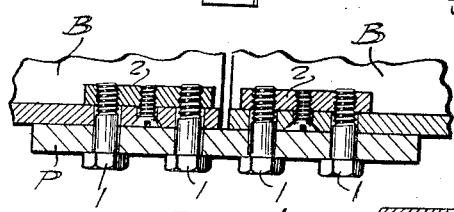
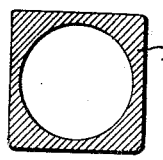
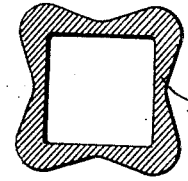
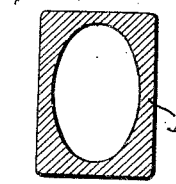
INVENTOR.
William M. Scott Jr.
BY
Cornelius D. Ehret
ATTORNEY.

Patented Nov. 29, 1938

2,138,617

UNITED STATES PATENT OFFICE 2,138,617

ELECTRICAL CONDUCTOR

William M. Scott, Jr., Philadelphia, Pa., assignor to I-T-E Circuit Breaker Company, Philadelphia, Pa., a corporation of New Jersey Application January 25, 1936, Serial No. 60,768

5 Claims. (Cl. 173—13)

My invention relates to electrical conductors and particularly to bus bars, of switchboards and the like, for direct or alternating currents of great magnitude.

In accordance with my invention the bus bar is preferably made in the form of a substantially rectangular tube whose walls are arched or tapered to provide greater conductivity at and near the corners of the tube, and to resist the tendency of the tube to bend, collapse, or otherwise become deformed, under the stresses incident to conduction of heavy currents.

My invention further resides in the features of construction and arrangement hereinafter described and claimed.

For an understanding of my invention and for illustration of various forms thereof, reference is to be had to the accompanying drawing, in which:

Figures 1 and 2 are cross-sectional views of two forms of the new conductor;

Fig. 3, in perspective, illustrates the mode of connecting sections of the conductor;

Fig. 4 is a detail view in section of the conductor and connecting plate of Fig. 3;

Fig. 4a illustrates, in perspective, the mode of attaching a feeder to a main bus bar;

Fig. 5 is a perspective view of a ventilated conductor;

Fig. 6 is an elevational view, partly in section, illustrating a conductor mounting;

Figs. 7 to 9 are cross-sectional views of further modifications of the conductor.

The capacity of modern distribution systems is so large that, under conditions of short circuit, for example, the current through the bus bars may be so great that the electro-magnetic stresses distort them, with possibility of engagement between bus bars of different legs of the circuit. To avoid this, it has been the practice with solid flat bus bars to support or secure them at rather short distances along their length. However, this expedient substantially increases the cost of an installation.

Referring to Fig. 1, the bus bar B is a tube of copper, aluminum or other suitable conductor, whose perimeter is a polygon, specifically a rectangle, and whose walls are substantially thicker at the corners and progressively thinner toward the center. With this construction, the bus bars are very stiff and are capable of resisting the substantial bending forces to which they are subjected when disposed in proximity to each other and traversed by heavy currents.

The metal of tubular conductor B is so distributed that the moment of inertia of the conductor, either about a neutral axis normal to one side, or about a diagonal axis, is greater than can be obtained with a conductor of the same external shape but of uniform wall thickness. In addition to preventing bending of adjacent conductors, the arched form of the walls practically eliminates the possibility of collapse of the individual conductor tube by the electro-magnetic effects of heavy currents. Bending stresses at the centers of the walls are substantially avoided; only a compressive stress exists at these points.

This construction also has the advantage, when used for alternating current, that the cross-section of the bus bar is greatest at the regions toward which the current is forced by electro-magnetic action, combining economic use of the conducting material with great mechanical strength.

Sections of the conductor may be connected together to obtain a bus bar of any desired length. For example, as shown in Fig. 3, the two sections B, B may be placed end to end and connected by the flat plates P, P held thereto by bolts 1. As shown in Fig. 4, the bolts may be received by nuts or plates 2 brazed, or otherwise suitably secured, to the inside of the bars. The joint is of low resistance and does not require special or expensive fittings. By the same method, feeders BF extending at any angle to the main bus bar may be simply attached thereto, as shown in Fig. 4a.

As the bus bar possesses an unusually high section modulus, the spacing between supports may safely be increased, and a simple mounting, such as shown in Fig. 6, may be employed. To the insulator 3 is secured the plate 4 which receives the bolts 5 which pass through the plate 6 supported by insulator 3a. The bus bar B is held between the two plates 4 and 6 which retain it in position. Preferably the conductor is not tightly clamped, for it may then elongate or contract upon change of temperature without undue strain on the supports. The bus bar construction permits not only use of fewer supports, but also simple construction of the lesser number of supports used.

In the bus bar shown in Fig. 1, the radius of curvature R of the central portion of the walls is large, and the radius of curvature $r$ of the corners is substantially less. The curves are preferably tangent so that the wall thickness varies smoothly, increasing progressively from the center of each wall toward the corners.

To give a specific example, for a copper conductor having a normal capacity of about 6000 amperes of alternating current or a greater amount of direct current, the bus bar may be six inches on a side, with a wall thickness of about $\frac{3}{16}''$ at the center, a radius $r$ of .75 inch at the corners, and a radius $R$ of 8 inches for the curve defining the inner surface of each wall between corners. The sides of the rectangle may be of unequal lengths.

The conductor B1, shown in Fig. 2, is similar to that of Fig. 1 and has the same advantages of mechanical strength, economic distribution of conducting material for alternating current, simplicity of mounting, etc., above discussed. However, it is slightly different in that the greater thickness of each of the walls toward the corners is obtained by a divergent straight line construction, as appears from the drawing, instead of by a curve whose axis, Fig. 1, is on a line normal to the center of the wall.

In the modification shown in Fig. 7, the bus bar B2 is externally rectangular and has a circular inner perimeter. This construction also has the advantages of mechanical rigidity, and greater conductivity at regions of greatest current above described.

The conductor B3 of Fig. 8 is similar except that the inner perimeter is ellipsoidal.

In the construction of bus bar B4 shown in Fig. 9, the distribution of metal to obtain high rigidity and greater conductivity at regions of high current is effected by having the cross-section of the bore rectangular in shape, with externally curved sides or faces, each of whose centers of curvature is external to the conductor on a line normal to the center of the side wall.

All of the various conductors herein disclosed can be manufactured by the extrusion or drawing process. Each of them consists of a single metallic structure whose perimeter or periphery is continuous.

If desired, provision for cooling by ventilation may be made, as shown in Fig. 5, by providing a series of holes S or openings of any suitable form extending entirely through the top and bottom, or any of the other walls of the conductor. The circulation of air through the openings provides for dissipation of heat energy related to the power losses in the conductor and avoids undue increase in the temperature of the conductor which would tend further to increase the power losses.

While I have illustrated several forms of conductor, it is to be understood my invention is not limited thereto, but is co-extensive in scope with the appended claims.

What I claim is:

1. A system for distribution of heavy currents comprising a tubular conductor whose outer perimeter is polygonal, and mountings for supporting a span of said conductor comprising flat plates for engaging opposite flat sides of said perimeter of said conductor, the bore of said conductor having such shape the thickness of each wall increases from its center toward its integral junctions with the adjacent walls to provide that all walls of the conductor shall assist in resisting bending forces exerted on the energized conductor span by an externally produced field and resist collapsing forces exerted on the conductor by magnetic effects arising from its own conduction of current.

2. A system for transmission of heavy currents comprising a one-piece tubular conductor the cross section of whose wall has an outer perimeter between which and its inner perimeter said wall is non-uniform in thickness, thickest at the portion or portions of said outer perimeter toward which the current is forced by electromagnetic reaction occurring within said conductor itself, and at least one of said perimeters having polygonal contour.

3. A system for transmission of heavy currents comprising a one-piece tubular conductor whose outer perimeter is polygonal to facilitate mounting and whose bore is of such shape the conductor is substantially thicker at and near the corners than between the corners.

4. A bus-bar system for transmission of heavy alternating currents comprising a one-piece tubular conductor whose outer perimeter is polygonal and whose wall is thicker at and near the corners to reduce power losses in the conductor due to electromagnetic effects of the transmitted current upon its distribution in the conductor.

5. A bus-bar system for distribution of heavy alternating currents comprising one-piece tubular conductors, and means for supporting said conductors at intervals to position them in proximate spaced relation, the outer perimeters of said conductors being polygonal to facilitate mounting on said supporting means and the wall thickness of said conductors increasing toward the corners to reduce power losses in the conductors due to electromagnetic effects of the transmitted current upon its distribution in the conductors, and to resist mutual flexing forces exerted upon the conductors under short-circuit conditions.

WILLIAM M. SCOTT, JR.